(12) United States Patent
Sato et al.

(10) Patent No.: US 8,209,448 B2
(45) Date of Patent: Jun. 26, 2012

(54) DATA PROCESSING APPARATUS AND METHOD OF PROTECTING A PERIPHERAL DEVICE IN DATA PROCESSING APPARATUS

(75) Inventors: Junichi Sato, Kanagawa (JP); Hitoshi Suzuki, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 457 days.

(21) Appl. No.: 12/292,256

(22) Filed: Nov. 14, 2008

(65) Prior Publication Data
US 2009/0144465 A1 Jun. 4, 2009

(30) Foreign Application Priority Data

Nov. 29, 2007 (JP) ................................. 2007-308459

(51) Int. Cl.
*G06F 3/00* (2006.01)
*G06F 13/00* (2006.01)
*G06F 12/00* (2006.01)
(52) U.S. Cl. ............. 710/37; 710/36; 710/107; 710/200
(58) Field of Classification Search ................ 710/1, 36, 710/37, 107, 200–244
See application file for complete search history.

(56) References Cited

U.S. PATENT DOCUMENTS

| | | | |
|---|---|---|---|
| 7,337,366 B2 * | 2/2008 | Taniguchi | 714/39 |
| 7,404,019 B2 | 7/2008 | Moyer et al. | |
| 7,434,264 B2 | 10/2008 | Moyer et al. | |
| 2004/0177266 A1 | 9/2004 | Moyer et al. | |
| 2004/0221173 A1 | 11/2004 | Moyer et al. | |

FOREIGN PATENT DOCUMENTS

| | | |
|---|---|---|
| JP | 60-230248 | 11/1985 |
| JP | 62-274445 A | 11/1987 |
| JP | 64-78343 A | 3/1989 |
| JP | 2006-523347 | 10/2006 |

OTHER PUBLICATIONS

Japanese Office Action dated Feb. 24, 2009 with Partial English-Language Translation.

* cited by examiner

*Primary Examiner* — Richard B Franklin
(74) *Attorney, Agent, or Firm* — McGinn Intellectual Property Law Group, PLLC

(57) ABSTRACT

A data processing apparatus includes an arithmetic circuit and a peripheral device protection circuit that controls access of the arithmetic circuit to the peripheral devices. The peripheral device protection circuit has a first protection preset value and a second protection preset value set as a protection level higher than that of the first protection preset value. The peripheral device protection circuit includes: a setting selection circuit that generates access permission/denial information by referring to the first protection preset value and the second protection preset value when the arithmetic circuit operates at a first operation authority level, or by referring to the second protection preset value when the arithmetic circuit operates at the second operation authority level. An access protection circuit that determines permission/denial of access to the peripheral devices based on access information output from the arithmetic circuit and the access permission/denial information.

19 Claims, 11 Drawing Sheets

| Preset values of setting registers | | | Access permission/denial information | | | |
|---|---|---|---|---|---|---|
| Level 3 | Level 2 | Level 1 | Management authority | OS authority | User authority | |
| PERMITTED 0 | PERMITTED 0 | PERMITTED 0 | PERMITTED 0 | PERMITTED 0 | PERMITTED 0 | First setting |
| PERMITTED 0 | PERMITTED 0 | DENIED 1 | PERMITTED 0 | PERMITTED 0 | DENIED 1 | Second setting |
| PERMITTED 0 | DENIED 1 | PERMITTED 0 | PERMITTED 0 | DENIED 1 | DENIED 1 | Third setting |
| PERMITTED 0 | DENIED 1 | DENIED 1 | PERMITTED 0 | DENIED 1 | DENIED 1 | Third setting |
| DENIED 1 | PERMITTED 0 | PERMITTED 0 | DENIED 1 | DENIED 1 | DENIED 1 | Fourth setting |
| DENIED 1 | PERMITTED 0 | DENIED 1 | DENIED 1 | DENIED 1 | DENIED 1 | Fourth setting |
| DENIED 1 | DENIED 1 | PERMITTED 0 | DENIED 1 | DENIED 1 | DENIED 1 | Fourth setting |
| DENIED 1 | DENIED 1 | DENIED 1 | DENIED 1 | DENIED 1 | DENIED 1 | Fourth setting |

Fig. 4

|  | FIRST SETTING REGISTER (LEVEL 1) | SECOND SETTING REGISTER (LEVEL 2) | THIRD SETTING REGISTER (LEVEL 3) |
|---|---|---|---|
| CLOCK | 1 | 1 | 1 |
| INTC | 1 | 1 | 0 |
| DMA | 1 | 0 | 0 |
| TIMER | 0 | 0 | 0 |
|  | ↑ PROTECTION FOR USER AUTHORITY | ↑ PROTECTION FOR OS AUTHORITY | ↑ PROTECTION FOR MANAGEMENT AUTHORITY |

Fig. 5

| | USER PROGRAM 1 FIRST SETTING REGISTER (LEVEL 1) | USER PROGRAM 2 FIRST SETTING REGISTER (LEVEL 1) | USER PROGRAM 3 FIRST SETTING REGISTER (LEVEL 1) | COVER REGISTER (LEVEL 1) | SECOND SETTING REGISTER (LEVEL 2) | THIRD SETTING REGISTER (LEVEL 3) |
|---|---|---|---|---|---|---|
| CLOCK | 1 | 1 | 1 | 1 | 1 | 1 |
| INTC | 1 | 1 | 1 | 1 | 1 | 0 |
| DMA | 1 | 1 | 1 | 1 | 0 | 0 |
| TIMER A | 0 | 0 | 1 | 0 | 0 | 0 |
| TIMER B | 0 | 1 | 0 | 0 | 0 | 0 |
| SERIAL | 1 | 0 | 0 | 0 | 0 | 0 |
| PARALLEL | 0 | 0 | 0 | 0 | 0 | 0 |
| | ↑ PROTECTION FOR USER AUTHORITY | ↑ PROTECTION FOR USER AUTHORITY | ↑ PROTECTION FOR USER AUTHORITY | ↑ PROTECTION FOR USER AUTHORITY | ↑ PROTECTION FOR OS AUTHORITY | ↑ PROTECTION FOR MANAGEMENT AUTHORITY |

Fig. 9

DATA PROCESSING APPARATUS AND METHOD OF PROTECTING A PERIPHERAL DEVICE IN DATA PROCESSING APPARATUS

BACKGROUND

1. Field of the Invention

The present invention relates to a data processing apparatus and a method of protecting peripheral devices in the data processing apparatus. In particular, the present invention relates to a data processing apparatus including an arithmetic circuit that executes a program and a peripheral device protection circuit that controls access of the arithmetic circuit to peripheral devices, and a method of protecting peripheral devices in the data processing apparatus.

2. Description of Related Art

In a data processing apparatus including an arithmetic circuit that executes a program and peripheral devices accessed by the arithmetic circuit, the peripheral devices that can be accessed by the arithmetic circuit may be restricted depending on the program to be executed. By restricting the access to the peripheral devices, the peripheral device used by a presently running program is prevented from being accessed by another program that performs an unauthorized operation, for example.

An example of the data processing apparatus that performs the access control is disclosed in Japanese Unexamined Patent Application Publication No. 60-230248. Japanese Unexamined Patent Application Publication No. 60-230248 proposes a system for protecting a memory serving as one of peripheral devices. The system disclosed in Japanese Unexamined Patent Application Publication No. 60-230248 includes a plurality of memory protecting map registers and a plurality of memory protecting control bits for selecting the memory protecting map registers. Access to memory areas respectively corresponding to the contents of the memory protecting map registers is restricted, thereby preventing an unauthorized change of data stored in the memory areas respectively corresponding to the contents of the memory protecting map registers. Further, a combination of the memory protecting map registers to be used is selected by controlling the contents of the memory protecting control bits. Thus, switching of a memory protecting map is performed upon switching of a task executed by the arithmetic circuit.

Furthermore, Japanese Unexamined Patent Application Publication No. 2006-523347 discloses a method of restricting access of each of bus masters and a bus slave to peripheral devices in a data processing system in which the bus masters, the bus slave, and the peripheral devices are connected to one another via buses. As disclosed in Japanese Unexamined Patent Application Publication No. 2006-523347, a trusted bus master dynamically updates the authority and reliability attribute of the bus masters, and the access control of the peripheral devices, thereby improving the reliability in providing access to the peripheral devices in the data processing system.

In the technique disclosed in Japanese Unexamined Patent Application Publication No. 60-230248, however, it is necessary to perform setting of the access control for the peripheral devices individually for each program to be run on the system. For instance, regardless of whether the program is a trusted program like an OS or an untrusted program like a user application, it is necessary to perform setting of the access control individually for each program. In the system disclosed in Japanese Unexamined Patent Application Publication No. 2006-523347, the trusted bus master sets access control of an untrusted bus master and the like. Also in the technique disclosed in Japanese Unexamined Patent Application Publication No. 2006-523347, however, the setting for the access control is performed by a system designer or a program designer who designs a program to be run on the system. For this reason, it is necessary to ensure the setting for each program or system in order to improve the reliability. In the techniques disclosed in Japanese Unexamined Patent Application Publication Nos. 60-230248 and 2006-523347, if an error occurs in the setting of the access control itself, there arises a problem in that adequate reliability of the system cannot be secured because there is nothing to compensate for the error. Particularly in a system in which untrusted programs are supplied by a plurality of vendors, it is highly likely that an error occurs in the setting of the access control, which causes a problem of a significant reduction in reliability.

Further, when the setting for the access control is stored in a register or the like, even though the setting for the application is correct, the setting may be changed due to an error of hardware, such as a soft error. In the methods disclosed in Japanese Unexamined Patent Application Publication Nos. 60-230248 and 2006-523347, the access control is set only for each program or system. Accordingly, if the setting of the access control is changed due to the error of hardware, there is a fear that a malfunction occurs, since the system operates in accordance with the setting thus changed. In short, in the methods disclosed in Japanese Unexamined Patent Application Publication Nos. 60-230248 and 2006-523347, there is a problem in that adequate reliability cannot be secured due to the problem of the hardware error.

SUMMARY

The present inventors have found a problem of adequate reliability of the system being secured.

A first exemplary aspect of an exemplary embodiment of the present invention is a data processing apparatus including: an arithmetic circuit that executes a plurality of programs at one of a first operation authority level and a second operation authority level, the second operation authority level being an operation authority level higher than the first operation authority level; and a peripheral device protection circuit that is connected to the arithmetic circuit, and that controls access of the arithmetic circuit to at least one peripheral device. In the data processing apparatus, the peripheral device protection circuit includes a first protection preset value including a preset value to specify permission or denial of the access to the at least one peripheral device, and a second protection preset value set as a protection level higher than that of the first protection preset value and including a preset value to specify permission or denial of the access to the at least one peripheral device. Further, the peripheral device protection circuit includes a setting selection circuit that generates access permission/denial information by referring to both the first protection preset value and the second protection preset value when the arithmetic circuit executes access to the at least one peripheral device during a period when the arithmetic circuit operates at the first operation authority level, and that generates the access permission/denial information by referring to the second protection preset value when the arithmetic circuit executes access to the at least one peripheral device during a period when the arithmetic circuit operates at the second operation authority level; and an access protection circuit that receives access information about the at least one peripheral device, the access information output from the arithmetic circuit, and the access permission/denial information, and that determines one of permission and denial of the access from the arithmetic circuit to at least one peripheral device.

A second exemplary aspect of an embodiment of the present invention is a method of protecting a peripheral device in a data processing apparatus, the data processing apparatus including: an arithmetic circuit that executes a plurality of programs at one of a first operation authority level and a second operation authority level, the second operation authority level being an operation authority level higher than the first operation authority level; and a peripheral device protection circuit that controls access of the arithmetic circuit to the peripheral device based on a first protection preset value including a preset value to specify permission or denial of the access to the peripheral device, and based on a second protection preset value set as a protection level higher than that of the first protection preset value and including a preset value to specify permission or denial of the access to the peripheral device, the method including: determining access permission/denial by referring to both the first protection preset value and the second protection preset value when the arithmetic circuit executes access to the peripheral device during a period when the arithmetic circuit operates at the first operation authority level; and determining the access permission/denial by referring to the second protection preset value when the arithmetic circuit executes access to the peripheral device during a period when the arithmetic circuit operates at the second operation authority level.

The data processing apparatus and the access protection method for the data processing apparatus according to the first and second exemplary aspects of the present invention provide the peripheral device protection circuit that performs access control based on the first protection preset value and/or the second protection preset value when access of the arithmetic circuit to the peripheral devices is generated. More specifically, the peripheral device protection circuit generates the access permission/denial information when the arithmetic circuit operates at the first operation authority level by referring to the first and second protection preset values, and generates the access permission/denial information by referring to the second protection preset value when the arithmetic circuit operates at the second operation authority level. As a result, even when the first protection preset value is not correct, for example, as long as the access control is performed based on the second protection preset value, the access to the peripheral devices at the first operation authority level can be prevented. In other words, in the data processing apparatus according to an exemplary embodiment of the present invention, contents of higher-level protection setting are reflected in lower-level protection setting. Consequently, according to the present invention, it is possible to improve the reliability of the data processing apparatus.

The data processing apparatus according to an exemplary embodiment of the present invention is capable of securing high reliability even when an error occurs upon setting of access control.

BRIEF DESCRIPTION OF THE DRAWINGS

The above and other objects, advantages and features of the present invention will be more apparent from the following description of certain exemplary embodiments taken in conjunction with the accompanying drawings, in which:

FIG. 4 is a truth table of the setting selection circuit according to the first exemplary embodiment of the present invention;

FIG. 5 is a diagram showing an example of preset values of setting registers provided in the data processing apparatus according to the first exemplary embodiment of the present invention;

FIG. 9 is a diagram showing an example of preset values of setting registers provided in a data processing apparatus according to the second exemplary embodiment of the present invention;

DETAILED DESCRIPTION OF THE EXEMPLARY EMBODIMENTS

First Exemplary Embodiment

Figure 1:
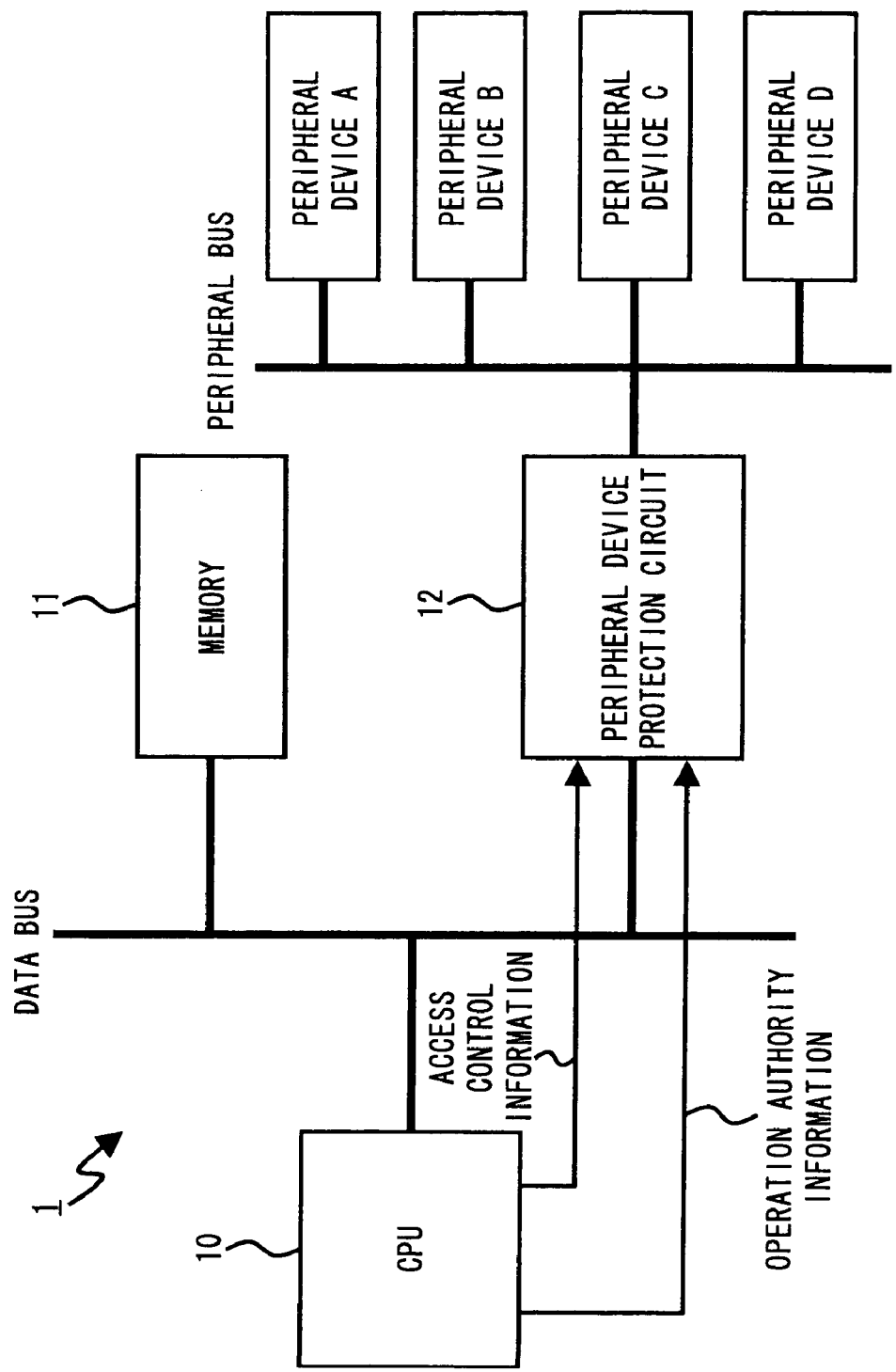
FIG. 1 is a block diagram showing a data processing apparatus according to an exemplary embodiment of the present invention.

Hereinafter, exemplary embodiments of the present invention will be described with reference to the attached drawings. FIG. 1 shows a block diagram of a data processing apparatus 1 according to a first exemplary embodiment of the present invention. Referring to FIG. 1, the data processing apparatus 1 includes an arithmetic circuit (for example, CPU: Central Processing Unit) 10, a storage device (for example, memory) 11, a peripheral device protection circuit 12, peripheral devices A to D, a data bus, and a peripheral bus. The CPU 10 is connected to each of the memory 11 and the peripheral device protection circuit 12 via the data bus. The CPU 10 is further connected to the peripheral bus via the peripheral device protection circuit 12. The peripheral bus is connected to each of the peripheral devices A to D. Note that, though four peripheral devices are illustrated in FIG. 1, one or more peripheral devices may be connected to the peripheral bus. Further, though the peripheral device protection circuit 12 is disposed between the data bus and the peripheral bus in FIG. 1, the peripheral device protection circuit 12 may be disposed at each connection between each of the peripheral devices and the peripheral bus, for example, as long as the peripheral device protection circuit 12 is disposed between the CPU 10 and the peripheral devices. Furthermore, the peripheral device protection circuit 12 may be disposed between the CPU 10 and the data bus. In this case, the data bus and the peripheral bus are the same, and the peripheral device protection circuit 12 may restrict access to the memory 11.

The CPU 10 is an arithmetic section that executes a program. Further, the CPU 10 outputs access control information, operation authority information, and access information depending on the program to be executed. The access control information specifies permission or denial of access to the peripheral devices for the operation authority levels that are specified individually for each program to be executed. The operation authority information indicates operation authority levels depending on the program to be executed. The operation authority levels each indicate an operation authority level of the CPU 10 and also indicate a range of peripheral devices which can be accessed by the CPU 10. The access information is output to the data bus and contains an access destination address that indicates an address of each of the peripheral devices to be accessed.

Note that the operation authority levels include a first operation authority level and a second operation authority level that is an operation authority level higher than the first operation authority level. In the following description, an example is described in which the data processing apparatus 1 has three protection levels (for example, user authority level, OS authority level, and management authority level). As for the operation authority levels used in the following description, it is assumed that two of the three operation authority levels are referred to, and that the lower operation authority level corresponds to the first operation authority level and the higher operation authority level corresponds to the second operation authority level.

Further, the access control information contains a first protection preset value and a second protection preset value. The first protection preset value includes a preset value that specifies permission or denial of the access of the CPU 10 to the peripheral devices. The second protection preset value is set as a protection level higher than that of the first protection preset value, and includes a preset value that specifies permission or denial of the access of the CPU 10 to the peripheral devices. In the following description, an example is described in which the data processing apparatus 1 has three protection levels (for example, Level 1, Level 2, and Level 3). As for the protection preset values used in the following description, it is assumed that two of the three protection preset values are referred to, and that a preset value set in accordance with the lower operation authority level corresponds to the first protection preset value and a preset value set in accordance with the higher operation authority level corresponds to the second protection preset value.

The memory 11 is used as an area for storing a program to be executed by the CPU 10 and also used as a memory area for temporarily storing data generated during processing of the program executed by the CPU 10.

The peripheral device protection circuit 12 controls whether to transmit the access information to the peripheral devices A to D based on the access control information, the access information, and the operation authority information. The access information is sent from the CPU 10 to the peripheral devices A to D. Specifically, the peripheral device protection circuit 12 receives the access control information, the access information, and the operation authority information. Then, when the operation authority level indicated by the operation authority information is equal to or higher than a permission level indicated by the access control information, the peripheral device protection circuit 12 permits transmission of the access information to the peripheral devices A to D. The peripheral device protection circuit 12 will be described in detail later.

The peripheral devices A to D are devices that fulfill various functions accessed by the CPU 10. Examples of the peripheral devices A to D include circuits such as a clock control circuit that generates an operation clock and controls a frequency, a serial interface circuit, and an interrupt controller. Note that the memory 11 may be used as one of the peripheral devices.

Figure 2:
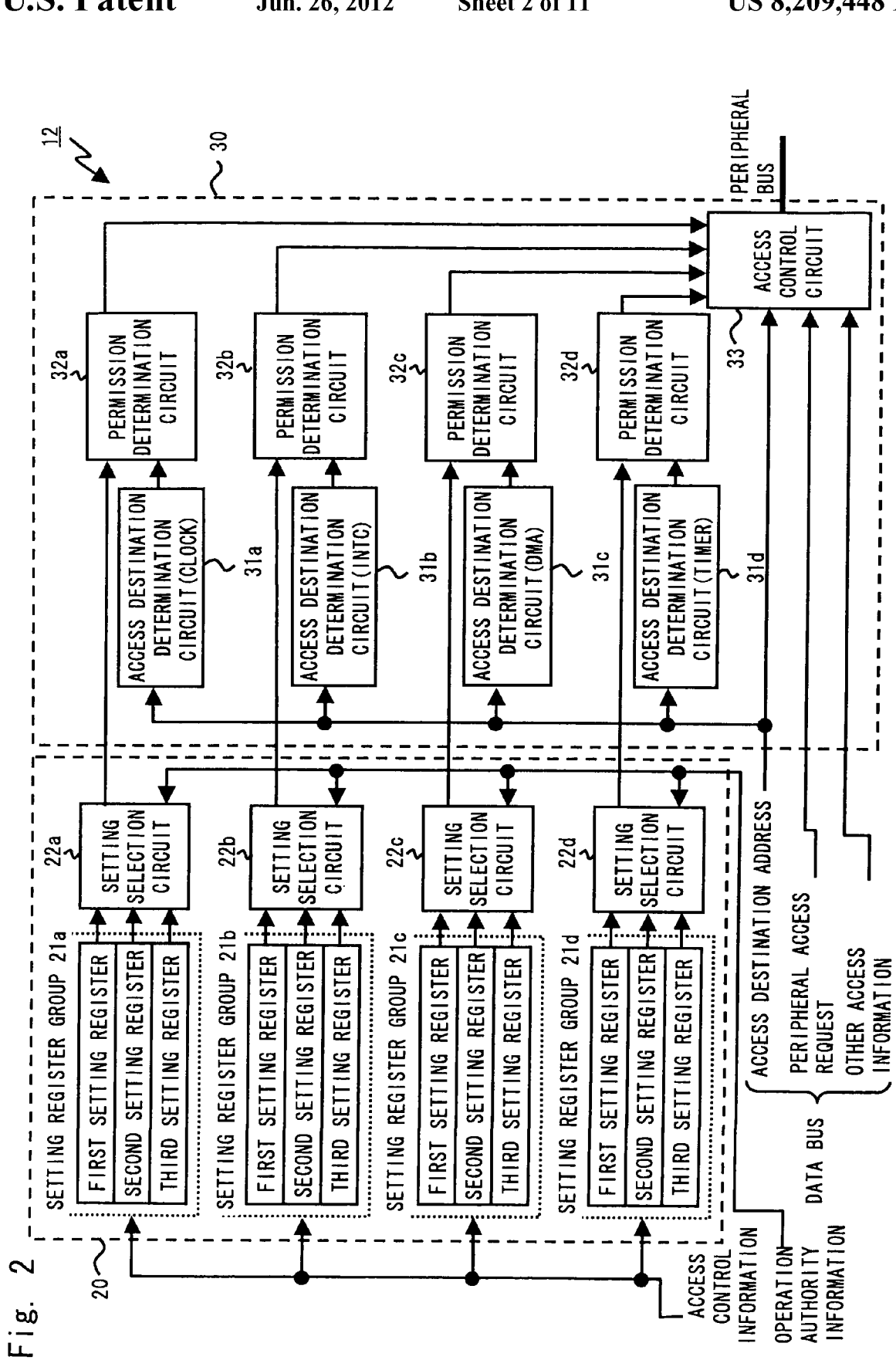
FIG. 2 is a block diagram showing a peripheral device protection circuit according to a first exemplary embodiment of the present invention.

Now, the peripheral device protection circuit 12 is described in detail. FIG. 2 shows a block diagram of the peripheral device protection circuit 12. Referring to FIG. 2, the peripheral device protection circuit 12 includes a peripheral device protection setting circuit 20 and an access protection circuit 30. The peripheral device protection setting circuit 20 includes a plurality of setting register groups 21a to 21d and a plurality of setting selection circuits 22a to 22d.

The number of the setting register groups 21a to 21d to be provided is determined depending on the number of peripheral devices to be protected. Since the example shown in FIG. 2 includes four peripheral devices to be protected, four setting register groups are provided. The setting register groups 21a to 21d have the same configuration, so the configuration of the setting register group 21a is described as a typical example of the setting register groups. The setting register group 21a includes first to third setting registers. Each of the first to third setting registers stores a preset value indicating permission or denial of access to the peripheral devices for each operation authority level contained in the access control information sent from the CPU 10. More specifically, the first setting register stores a preset value indicating permission or denial of access to the peripheral devices in the case where the operation authority information indicates the lowest authority level. The second setting register stores a preset value indicating permission or denial of access to the peripheral devices in the case where the operation authority information indicates an authority level intermediate between the highest authority level and the lowest authority level. The third setting register stores a preset value indicating permission or denial of access to the peripheral devices in the case where the operation authority information indicates the highest authority level.

The number of the plurality of setting selection circuits 22a to 22d to be provided is determined depending on the number of peripheral devices to be protected. Since the example shown in FIG. 2 includes four peripheral devices to be protected, four setting selection circuits are provided. The setting selection circuits 22a to 22d are provided respectively corresponding to the setting register groups 21a to 21d. In the example shown in FIG. 2, the setting selection circuit 22a is provided corresponding to the setting register group 21a, and the setting selection circuit 22b is provided corresponding to the setting register group 21b. The setting selection circuits 22a to 22d refer to the access control information stored in the setting register groups 21a to 21d, respectively. When the operation authority level contained in the operation authority information is equal to or higher than a permission level indicated by the access control information, the setting selection circuits 22a to 22d each output access permission/denial information (for example, 0) indicating a state in which the access is permitted. On the other hand, when the operation authority level contained in the operation authority information is lower than the permission level indicated by the access control information, the setting selection circuits 22a to 22d each output access permission/denial information (for example, 1) indicating a state in which the access is denied. The specific configuration of each of the setting selection circuits 22a to 22d is described later.

The access protection circuit 30 includes access destination determination circuits 31a to 31d, permission determination circuits 32a to 32d, and an access control circuit 33.

Peripheral device addresses each indicating the address of the corresponding peripheral device is set in advance in each of the access destination determination circuits 31a to 31d. Further, each of the access destination determination circuits 31a to 31d outputs a comparison matching result signal indicating a comparison result between the peripheral device address and the access destination address contained in the access information. For example, when the peripheral device address matches the access destination address, the comparison matching result signal indicates "0". When the peripheral device address does not match the access destination address, the comparison matching result signal indicates "1". Furthermore, according to an exemplary embodiment of the present invention, the access destination determination circuit 31a corresponds to a clock control circuit, and the access destination determination circuit 31b corresponds to an interrupt controller INTC. Further, the access destination determination circuit 31c corresponds to a direct memory access (DMA) controller, and the access destination determination circuit 31d corresponds to a timer.

The permission determination circuits 32a to 32d each output the access control information indicative of permission or denial of access to the peripheral devices based on the access permission/denial information output from each of the setting selection circuits 22a to 22d and based on the comparison matching result signal output from the access destination determination circuit. More specifically, the permission determination circuits 32a to 32d each output the access control information (for example, 0) indicating a permitted state to the peripheral device that is in a matched state (for example, 0) as indicated by the comparison matching result signal, when the corresponding access permission/denial information indicates "0". Meanwhile, when the comparison matching result signal or the access permission/denial information indicates mismatch or denial, the permission determination circuits 32a to 32d each output the access control information (for example, 1) indicating a denied state.

The access control circuit 33 controls whether to transmit the access information to the peripheral devices based on the access control information. The access information according to an exemplary embodiment of the present invention is output from the CPU 10 via the data bus, and contains the access destination address, a peripheral access request, and other access information. Further, the access control circuit 33 receives the pieces of access information. The access control circuit 33 outputs the access information to the peripheral bus when one of the values of the access control information output from the permission determination circuits 32a to 32d indicates the permitted state. On the other hand, when all the values of the access control information output from the permission determination circuits 32a to 32d indicate the denied state, the access control circuit 33 blocks the access information. When blocking the access information, the access control circuit 33 may notify the CPU 10 of access violation.

Figure 3:
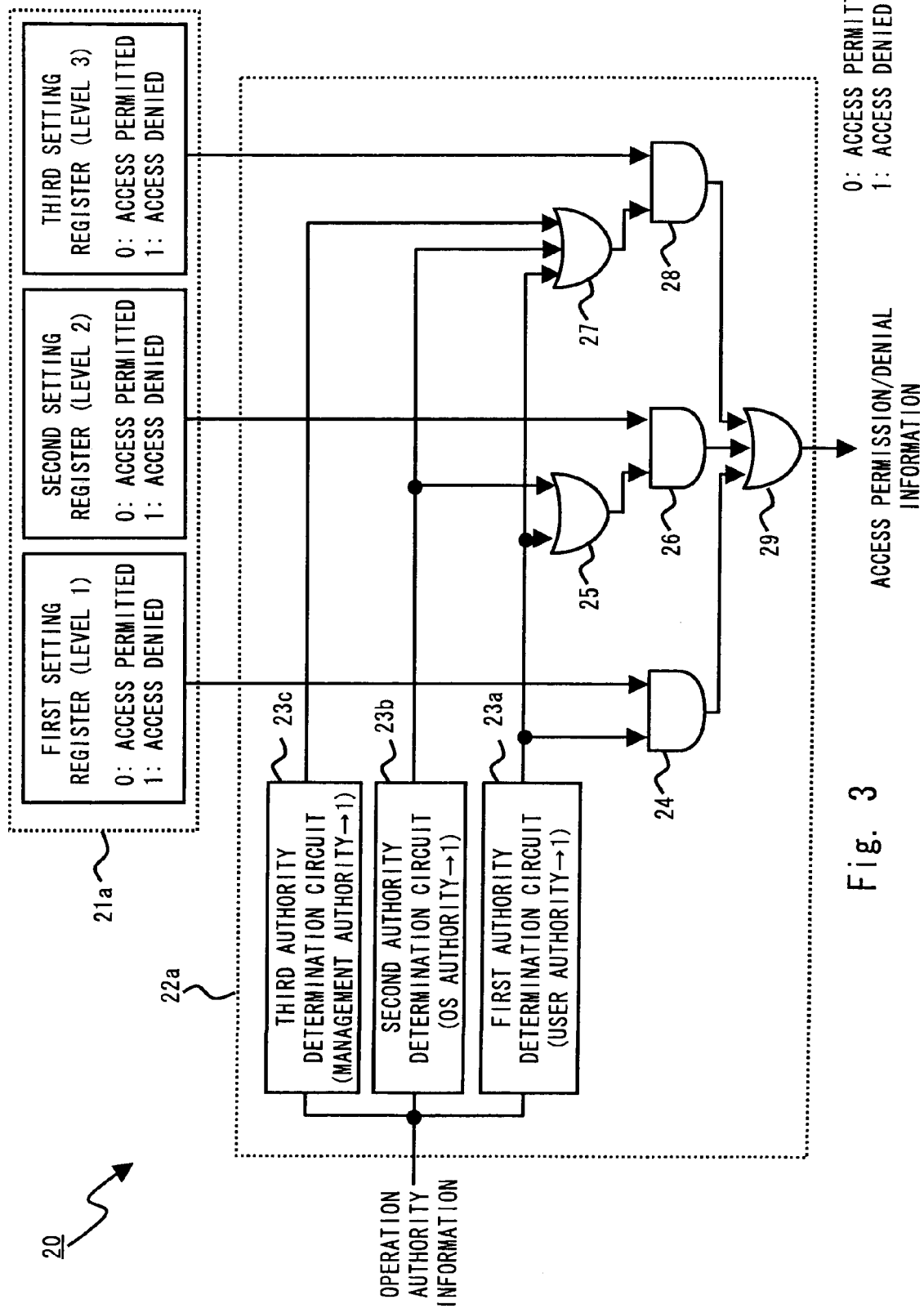
FIG. 3 is a block diagram showing a setting selection circuit according to the first exemplary embodiment of the present invention.

Next, a description is given of the configuration of each of the setting selection circuits 22a to 22d. Since the setting selection circuits 22a to 22d have the same configuration, the configuration of the setting selection circuit 22a is herein described as a typical example of the setting selection circuits. FIG. 3 shows a block diagram of the setting selection circuit 22a. Referring to FIG. 3, the setting selection circuit 22a includes first to third authority determination circuits 23a to 23c, AND circuits 24, 26, and 28, and OR circuits 25, 27, and 29.

The first authority determination circuit 23a determines whether the operation authority level contained in the operation authority information indicates the lowest level. The lowest operation authority level is, for example, the user authority level indicated when a user program is executed by the CPU 10. Specifically, the first determination circuit 23a outputs "1" as a determination result when the operation authority level indicated by the operation authority information corresponds to the user authority level. Meanwhile, when the operation authority level indicated by the operation authority information is a level other than the user authority level, the first determination circuit 23a outputs "0" as the determination result.

The second authority determination circuit 23b determines whether the operation authority level contained in the operation authority information indicates a medium level which is a level intermediate between the highest level and the lowest level. The medium operation authority level is, for example, the OS authority level indicated when a task related to an operating system (OS) is executed by the CPU 10. Specifically, the second determination circuit 23b outputs "1" as the determination result when the operation authority level indicated by the operation authority information corresponds to the OS authority level. Meanwhile, when the operation authority level indicated by the operation authority information is a level other than the OS authority level, the second authority determination circuit 23b outputs "0" as the determination result.

The third authority determination circuit 23c determines whether the operation authority level indicated by the operation authority information indicates the highest level. The highest operation authority level is, for example, the management authority level indicated when a management program is executed by the CPU 10. Specifically, the third authority determination circuit 23c outputs "1" as the determination result when the operation authority level indicated by the operation authority information corresponds to the management authority. Meanwhile, when the operation authority level indicated by the operation authority information is a level other than the management authority level, the third authority determination circuit 23c outputs "0" as the determination result.

Each of the AND circuits 24, 26, and 28 outputs a result of an AND operation on a plurality of input signals. Each of the OR circuits 25, 27, and 29 also outputs a result of an AND operation on a plurality of input signals. The AND circuit 24 receives the value output from the first authority determination circuit 23a and the preset value stored in the first setting register. The OR circuit 25 receives the value output from the first authority determination circuit 23a and the value output from the second authority determination circuit 23b. The AND circuit 26 receives the value output from the OR circuit 25 and the preset value stored in the second setting register. The OR circuit 27 receives the value output from the first authority determination circuit 23a, the value output from the second authority determination circuit 23b, and the value output from the third authority determination circuit 23c. The AND circuit 28 receives the value output from the OR circuit 27 and the preset value stored in the third setting register. The OR circuit 29 receives the values respectively output from the AND circuits 24, 26, and 28, and outputs an OR operation result of the input values as the access permission/denial information. The access permission/denial information indicates an access permitted state when the value is "0", and indicates an access denied state when the value is "1". Note that the access information stored in each of the first to third setting registers indicates the access permitted state when the stored value is "0" and indicates the access denied state when the value is "1".

In this case, a description is given of operations of the setting selection circuit 22a with reference to the truth table of the setting selection circuit 22a shown in FIG. 4. As for the preset values of the setting registers provided on the left side of FIG. 4, the values shown in the field of Level 3 are the preset values stored in the third setting register, and the values shown in the field of Level 2 are the preset values stored in the second setting register. Further, the values shown in the field of Level 1 are the preset values stored in the first setting register. Furthermore, each of the values of the access permission/denial information provided on the right side of FIG. 4 shows the permitted state or the denied state, which is indicated by the access permission/denial information, so as to correspond to each of the operation authority levels in each case of the preset values provided on the left side of FIG. 4.

First, a description is given of a case where the preset values stored in the setting registers are set in a first setting. In the first setting, all the Levels 1 to 3 indicate "0" (permitted state). In this case, the AND circuits 24, 26, and 28 each receive "0" from the corresponding setting register. As a result, the output value of each of the AND circuits 24, 26, and 28 is "0". Accordingly, the access permission/denial information indicates "0" (permitted state) at any operation authority level.

A description is given of a case where the preset values stored in the setting registers are set in a second setting. In the second setting, Level 1 indicates "1" (denied state), and Levels 2 and 3 indicate "0" (permitted state). In this case, the AND circuit 24 receives "1" from the first setting register. When the operation authority information indicates the user authority level, the output value of the AND circuit 24 is "1". Meanwhile, the AND circuits 26 and 28 each receive "0" from the corresponding setting register. As a result, the output value of each of the AND circuits 26 and 28 is "0". Accordingly, the access permission/denial information indicates 1 (denied state) only when the operation authority level corresponds to the user authority level.

A description is given of a case where the preset values stored in the setting registers are set in a third setting. In the third setting, Level 2 indicates "1" (denied state) and Level 3 indicates "0" (permitted state). In this case, the AND circuit 26 receives "1" from the second setting register. Then, when the operation authority information indicates the user authority level or the OS authority level, the output value of the AND circuit 26 is "1". Meanwhile, the AND circuit 28 receives "0" from the third setting register. As a result, the output value of the AND circuit 28 is "0". Accordingly, when the operation authority level corresponds to the OS authority level, the access permission/denial information indicates "1" (denied state). On the other hand, when the operation authority level corresponds to the management authority level, the access permission/denial information indicates "0" (permitted state). Furthermore, when the operation authority level corresponds to the user authority level, the output value "1" of the AND circuit 26 is obtained based on the preset value of Level 2. As a result, the access permission/denial information indicates "1" (denied state) irrespective of the preset value of Level 1.

A description is given of a case where the preset values stored in the setting registers are set in a fourth setting. In the fourth setting, Level 3 indicates "1" (denied state). In this case, the AND circuit 28 receives "1" from the third setting register. Further, the output value of the AND circuit 28 is "1" when the operation authority information indicates any one of the user authority level, the OS authority level, and the management authority level. Accordingly, when the preset value of Level 3 is "1", the access permission/denial information indicates "1" (denied state) at any operation authority level. Specifically, in the case where the preset value of Level 3 is "1", the access permission/denial information corresponding to the user authority level and the OS authority level indicates "1" (denied state) when the preset value of each of Levels 1 and 2 is "0" or "1".

In short, the peripheral device protection circuit 12 according to an exemplary embodiment of the present invention is capable of restricting access to the peripheral devices with the operation authority level equal to or lower than the operation authority level at which the denied state is set, irrespective of the value stored in the setting register, as long as "1" (denied state) is set to the setting register corresponding to the higher level.

Next, a description is given of an example of access protection setting according to an exemplary embodiment of the present invention. FIG. 5 shows an example of the access protection setting according to an exemplary embodiment of the present invention. Referring to FIG. 5, in the protection setting for the important peripheral devices such as the clock control circuit associated with an integral part of operations of the data processing apparatus 1 according to an exemplary embodiment of the present invention, "1" (denied state) is set to each of the first to third setting registers, thereby reinforcing the protection of the peripheral devices. Further, the access to the peripheral devices such as the interrupt controller INTC is restricted by performing setting of the permitted state only for the operations of the management authority level to ensure the independence between programs executed in the data processing apparatus, thereby improving the reliability of the data processing apparatus.

Furthermore, for the peripheral devices such as a DMA controller and a timer, which are frequently used for a user program, switching between permission and denial is performed depending on the operation of the user program. In the example shown in FIG. 5, the access to the DMA controller under the user authority is denied, and the access to the timer under the user authority is permitted. Based on the preset values stored in the second setting register and the third setting register, the restriction on access to the peripheral devices, which are in the permitted state at the higher operation authority level, can be changed depending on the user program. In short, the value stored in the first setting register may be variously set depending on the user program.

Figure 6:
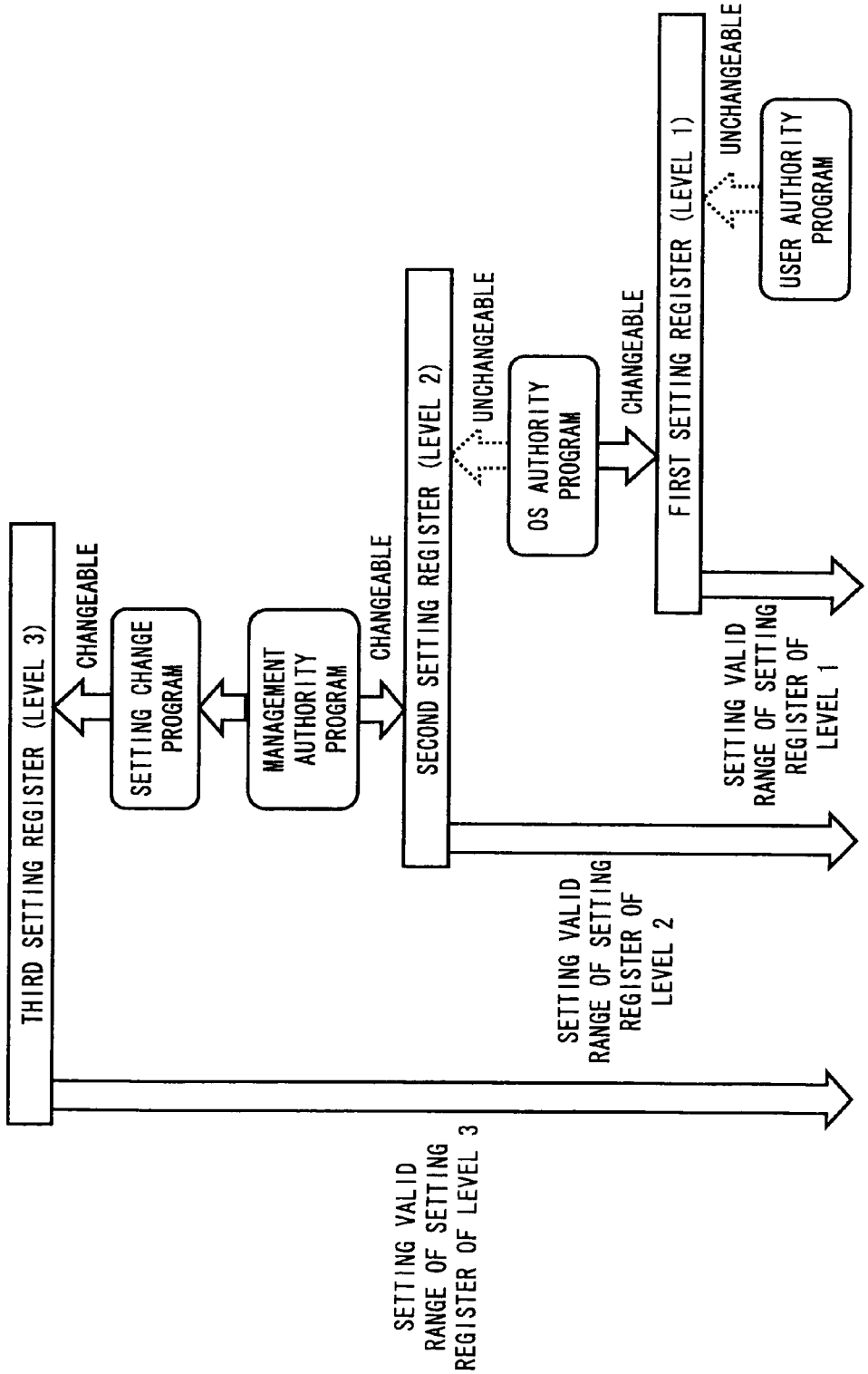
FIG. 6 is a conceptual diagram showing a method of changing the setting registers provided in the data processing apparatus according to the first exemplary embodiment of the present invention.

Next, a description is given of a method of changing the preset values stored in the setting registers. FIG. 6 is a conceptual diagram showing a method of changing the setting of the setting registers. Referring to FIG. 6, a program that runs at the user authority level corresponding to the lowest operation authority level is unable to change the setting of the first setting register for setting the access control for the user authority level. Further, the setting of the second setting register for setting the access control for the OS authority level and the setting of the third setting register for setting the access control for the management authority level cannot be changed under the user authority.

A program that runs at the OS authority level corresponding to the medium operation authority level is able to change the setting of the first setting register for setting the access control for the user authority level corresponding to the lowest user authority level. Meanwhile, the setting of the second setting register for setting the access control for the OS authority level cannot be changed under the OS authority. Furthermore, the setting of the third setting register for setting the access control for the management authority level cannot be changed under the OS authority.

A program that runs at the management authority level corresponding to the highest operation authority level is able to change the setting of the second setting register for setting the access control for the OS authority level corresponding to the medium authority level, and change the setting of the first setting register for setting the access control for the user authority level corresponding to the lowest authority level. Further, the program that runs at the management authority level is able to change the setting of the third setting register for setting the access control for the management authority level. Note that, according to an exemplary embodiment of the present invention, the program that runs under the management authority invokes a higher authority transfer program (for example, setting change program) to perform a setting change operation according to the setting change program. It is thus possible to prevent a reduction in reliability due to unintentional setting changes by the program running under the management authority.

Figure 7:
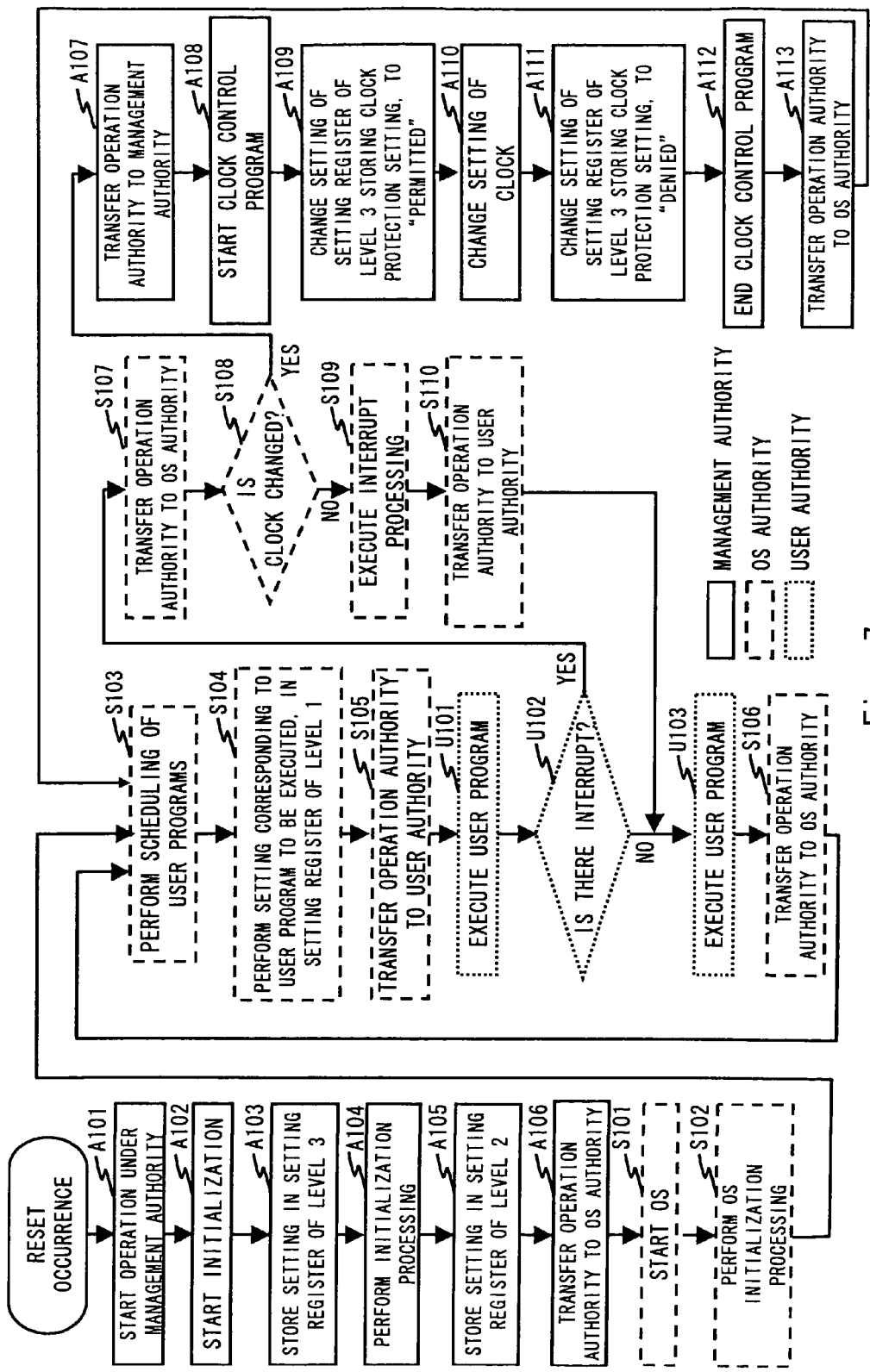
FIG. 7 is a flowchart showing operations of the data processing apparatus according to the first exemplary embodiment of the present invention.

Next, a description is given of operations of the data processing apparatus 1 according to an exemplary embodiment of the present invention. FIG. 7 is a flowchart showing the operations of the data processing apparatus 1. In the flowchart, Steps A101 to A113 show the processing executed under the management authority, and Steps S101 to S110 show the processing executed under the OS authority. Further, Steps U101 to U103 show the processing executed under the user authority.

Referring to FIG. 7, when a reset occurs on the CPU 10, the CPU 10 starts operating under the management authority (Step A101). Then, initialization of the CPU 10 is started (Step A102). Further, as the first step of the initialization, the CPU 10 outputs the access control information and stores the setting in the third setting register (Step A103). Through the processing of Step A103, the access to the most important peripheral device in the data processing apparatus 1 is protected. Then, the processing of initializing the CPU 10 is continuously carried out, and the initialization processing is completed (Step A104). After that, the CPU 10 outputs the access control information and stores the setting in the second setting register (Step A105). After Step A105 is completed, the program executed under the management authority transfers the operation authority to the OS, and the CPU 10 starts operating under the OS authority (Step A106).

Then, the CPU 10 reads out an OS program from the memory 11 and starts the OS program (Step S101). Then, the CPU 10 executes initialization processing and completes the initialization processing related to the OS program (Step S102). After that, the CPU 10 schedules user tasks executed in accordance with the user program (Step S103). Then, the CPU 10 performs setting corresponding to the user tasks executed according to the schedule, with respect to the first setting register (Step S104). After that, the OS program transfers the operation authority to the user program, and the CPU 10 starts operating under the user authority (Step S105).

In the operation under the user authority, the user tasks are executed in Steps U101 to U103. In the case where processing such as an interrupt does not occur during the execution of the user program, when the processing for the user tasks is completed, the user program transfers the operation authority to the OS program, and the CPU 10 starts operating under the OS authority (Step S106). The transfer of the operation authority from the lower authority to the higher authority is performed simultaneously with the initiation of a program that runs under the OS authority, for example, execution of a system call instruction. Accordingly, the operation authority is not transferred during the execution of the user program. When the processing of Step S106 is completed, the process returns to Step S103. Meanwhile, when an interrupt request is generated during the execution of the user tasks, the process proceeds to Step S107 through the processing of the user tasks being executed (Step U102).

In Step S107, the operation authority is transferred from the user program to the OS program, and the operation authority of the CPU 10 is transferred to the OS authority. Then, it is determined whether the processing for the interrupt request generated in Step U102 is processing restricted according to the OS authority, such as a change of a clock (Step S108). In Step S108, when it is determined that the interrupt processing does not correspond to the change of the clock, the process proceeds to Step S109. In Step S109, the interrupt processing is executed and completed. After that, the operation authority is returned from the OS program to the user program, and the operation authority of the CPU 10 is transferred to the user authority (Step S110). After Step S110 is completed, the process of Step U103 is executed. Note that the flowchart of FIG. 7 shows examples of the operations, and a plurality of interrupts may occur in Steps U101 to U103. Further, depending on the result of the process of Step S109, the process may proceed to Step S103, for example, without returning the operation authority to the original user program.

On the other hand, when it is determined that the interrupt processing corresponds to the change of the clock in Step S108, the process proceeds to Step A107. In Step A107, the operation authority is transferred from the OS program to the management program, and the CPU 10 starts operating under the management authority. Then, the management program calls a clock control task as a setting change program (Step A108). Through the clock control task, the setting of the third setting register storing the protection setting for the clock control circuit is changed (Step A109). After that, the CPU 10 accesses the clock control circuit to change the setting of the clock control circuit (Step A110). Next, the CPU 10 changes the setting of the third setting register to the denied state again (Step A111). Then, the CPU 10 performs processing for finishing the clock control task (Step A112). The operation authority is transferred from the management program to the OS program, and the CPU 10 resumes operation under the OS authority (Step A113). After that, the process returns to Step S103.

As described above, in the data processing apparatus according to an exemplary embodiment of the present invention, the management program, the OS program, and the user program are executed. The management program is a program that runs at the highest operation authority level. The management program is designed by, for example, a user of the data processing apparatus. Examples of the management program include a program for basic setting of a data processing system and a self-diagnostic program. In other words, the management program allows a basic operation of the data processing apparatus. For this reason, the management program is referred to a so-called "trusted program", the operation of which is verified with high precision.

The OS program provides a function commonly used among user programs executed in the data processing apparatus, and arbitrates between the user programs. The OS program may be designed by, for example, a user of the data processing apparatus or a third party. Though the OS program is verified with high precision because the OS program is commonly used among the user programs, the size of the program itself is large, and thus a malfunction is more likely to occur as compared with the management program. While the OS program is a trusted program, the reliability of the OS program is lower than that of the management program.

The user programs are programs for providing an individual function operating under the control of the OS program. The user programs are supplied from various vendors as well as users of the data processing apparatus. In other words, since the user programs are individually designed by the vendors, a malfunction is more likely to occur due to misunderstanding of a system, a human error, or the like. Further, since the user programs are individually designed by the vendors, it is highly likely that a reliability test in consideration of a cooperative operation with another user program is not satisfactorily conducted. For this reason, the user programs are each called an untrusted program.

The data processing apparatus according an exemplary embodiment of the present invention is capable of improving the reliability of access control of the peripheral devices in the data processing apparatus in which the management program, the OS program, and the user program are run.

Specifically, the CPU 10 of the data processing apparatus 1 switches the operation authority levels according to the program to be executed. The peripheral device protection circuit 12 refers to the operation authority levels and the access control information for setting permission or denial of access at each of the operation authority level and the operation authority level. Then, when the operation authority level is equal to or lower than the level corresponding to the denied state indicated by the access control information, the peripheral device protection circuit 12 blocks the access information output from the CPU 10. In other words, if the denied state is set at the higher operation authority level, the peripheral device protection circuit 12 prevents the CPU 10 from accessing the peripheral devices at the operation authority level lower than the set operation authority level.

Through the access control as described above, even when the setting for the untrusted user program is wrong, the access to the important peripheral device can be prohibited by setting the access control at the higher level. In short, the CPU 10 and the peripheral device protection circuit 12 according to an exemplary embodiment of the present invention are employed in the data processing apparatus in which the untrusted program is executed, which results in the improvement in reliability of the access control. A setting error is more likely to occur in a system in which a plurality of untrusted user programs are run, so the improvement in reliability provided by the data processing apparatus 1 according to an exemplary embodiment of the present invention is highly effective.

Further, according to an exemplary embodiment of the present invention, the access control information for the important peripheral device can be set in the data processing apparatus, according to the trusted program. Thus, the important peripheral device can be reliably prevented from being accessed by the untrusted user program. That is, the data processing apparatus 1 according to an exemplary embodiment of the present invention is capable of improving the reliability of the system even when the user program has an error.

Furthermore, according to an exemplary embodiment of the present invention, the access control information is stored in the setting registers. In this case, bit inversion may occur in the stored data due to a soft error or the like, as in the related art example. Even when the preset value stored in the setting register corresponding to the low operation authority level is corrupted due to the bit inversion, the setting register corresponding to the operation authority level higher than that of the setting register in which data is corrupted can restrict the access at the operation authority level corresponding to the setting register in which data is corrupted. In short, the data processing apparatus 1 according to an exemplary embodiment of the present invention is capable of improving the reliability even when a malfunction such as a soft error due to a hardware error occurs.

Further, the data processing apparatus according to an exemplary embodiment of the present invention is capable of reducing overheads relating to the setting change for the access control. According to the conventional method, the setting of the setting registers needs to be changed in accordance with the change of the operation authority level as well as the change of the program. Each of the setting register groups 21a to 21d according to an exemplary embodiment of the present invention, however, includes a setting register corresponding to each operation authority level. Each setting register stores access permission/denial information corresponding to each operation authority level. Thus, the data processing apparatus 1 according to an exemplary embodiment of the present invention does not change the setting register in accordance with the change of the operation authority level. Further, each of the setting selection circuits 22a to 22d constantly refers to the preset values of the first to third setting registers, and outputs the access permission/denial information. In other words, the data processing apparatus 1 according to an exemplary embodiment of the present invention is capable of adequately protecting the access at each operation authority level merely by changing the operation authority level, which is contained in the operation authority information, in accordance with the change of the operation authority level. Thus, the data processing apparatus 1 according to an exemplary embodiment of the present invention is capable of reducing overheads relating to the operation due to rewrite of the setting register, without rewriting the setting register upon switching of the operation authority level. Note that the setting for the OS authority and the management authority is changed also in the data processing apparatus 1 according to an exemplary embodiment of the present invention. For example, according to an exemplary embodiment of the present invention, the setting for the management authority is changed only at the time of startup (Step A103) and only when the important peripheral devices are individually accessed (Step A109). As for the change of the setting in Step A109, it is not necessary to change all the preset values. Further, the setting for the OS authority is changed only before starting an OS (Step A105). That is, since the frequency of the setting change for the OS authority and the management authority is much lower than that of the setting change for the user authority, the effect of a deterioration in performance of the data processing apparatus 1 is extremely small. Note that, depending on an operation mode of the system, the setting for the OS authority and the management authority may be changed upon switching of the program to be executed.

Second Exemplary Embodiment

Figure 8:
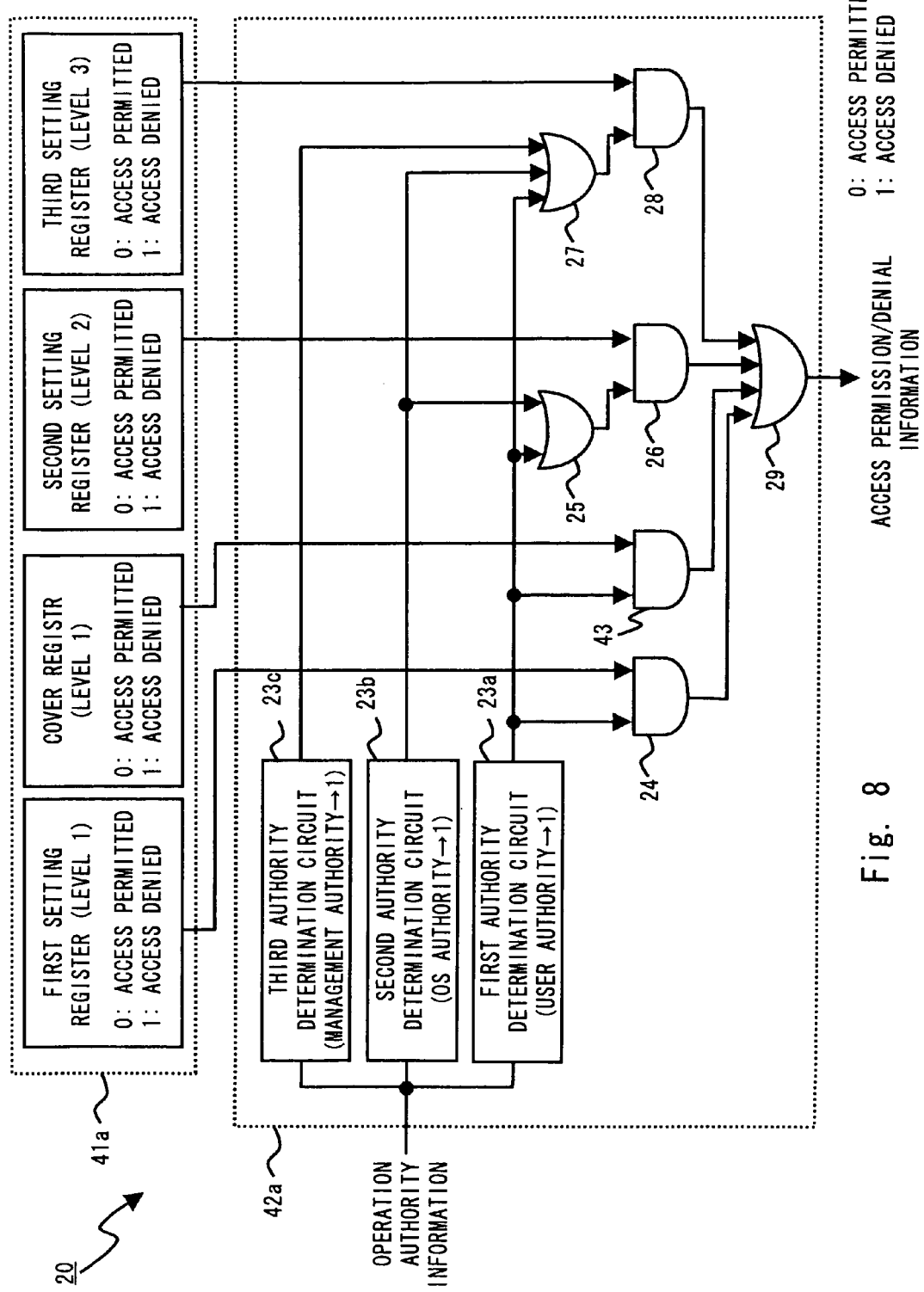
FIG. 8 is a block diagram showing a setting selection circuit according to a second exemplary embodiment of the present invention.

A second exemplary embodiment of the present invention is a modified example of the peripheral device protection setting circuit 20. FIG. 8 shows a block diagram of the peripheral device protection setting circuit 20 according to the second exemplary embodiment of the present invention. Referring to FIG. 8, the peripheral device protection setting circuit 20 according to the second exemplary embodiment of the present invention includes a setting register group 41a and a setting selection circuit 42a.

The setting register group 41a has a configuration in which a cover register for setting the lowest operation authority level of the setting register group 21a according to the first exemplary embodiment of the present invention is provided in addition to the first to third setting registers. In the cover register, values are set based on the access control information output from the CPU 10 in the same manner as in the other setting registers. The cover register stores a common protection preset value commonly used among all the user programs run at the lowest operation authority level. In the example according to the second exemplary embodiment of the present invention, as the common protection setting value set in the cover register, a result of an AND operation on the values stored in the lowest setting register (for example, first setting register) corresponding to the lowest operation authority level is stored. More specifically, in the first setting register, different values are set for different user programs to be executed by the CPU 10. The cover register stores AND operation results of a plurality of preset values stored in the first setting register for each user program.

The setting selection circuit 42a has a configuration in which an AND circuit 43 is provided in addition to the setting selection circuit 22a according to the first exemplary embodiment of the present invention. The AND circuit 43 outputs a result of an AND operation on the value set in the cover register and the value output from the first authority determination circuit. Then, an output of the AND circuit 43 as well as an output of each of the other AND circuits is input to the OR circuit 29.

FIG. 9 shows an example of the values stored in each of the setting registers when the cover register is used. Referring to FIG. 9, setting of the cover register will be described. As shown in FIG. 9, different values for different user programs are set in the first setting register. In this case, the denied state is set in the cover register with respect to the DMA controller in which the denied state (for example, "1") is set for any user program. On the other hand, the preset values such as "timer A" and "timer B" are set as the permitted state (for example, "0") in any user program. Accordingly, the permitted state is set as the preset value of the cover register.

Even when the permitted state is erroneously set in the first setting register for the peripheral device which is to be originally set as the denied state in any user program, a value which is commonly used among all the user programs and which indicates access permission/denial is set to the cover register, thereby preventing access to the peripheral device based on the preset value of the cover register. Specifically, when the preset value of the first setting register is erroneously set as the permitted state, the AND circuit 24 outputs "0". Meanwhile, when the denied state is set in the cover register, the AND circuit 43 outputs "1" under the user authority. That is, even when there is an error in the preset value of the first setting register, unauthorized access can be prevented based on the preset value of the cover register.

As described above, the data processing apparatus according to the second exemplary embodiment of the present invention is capable of improving the reliability in setting by using the cover register. In other words, the data processing apparatus 1 according to the second exemplary embodiment of the present invention is capable of securing the reliability higher than that of the first exemplary embodiment with respect to an unauthorized rewrite of the protection setting register. Note that the preset value of the cover register is changed according to the program running under the OS authority when an AND operation target of the cover register is the first setting register.

Note that the common protection preset value stored in the cover register may be a preset value used in common in a plurality of operation conditions among the preset values of the second setting register, which are rewritten depending on the operation conditions of the OS program. In this case, when access is made under the OS authority, the setting selection circuit 22a refers to the preset values stored in the second setting register and the common protection preset value, and outputs the access permission/denial information. At this time, the cover register is provided corresponding to the second setting register.

Further, the common protection preset value stored in the cover register may be a common value among the preset values stored in the first setting register and the second setting register. In this case, the setting selection circuit 22a outputs the access permission/denial information by referring to the common protection preset value as well as the preset values stored in the first setting register and the second setting register.

In short, the common protection preset value may be a common preset value among the preset values of a level equal to or lower than the operation authority level to be protected. Further, the setting selection circuit 22a may refer to the common preset value according to the operation authority level. Note that a plurality of cover registers may be provided in a single setting register group. For example, a single setting register group may include a first cover register that stores a common protection preset value for the first setting register, and a second cover register that stores a common protection preset value for the second setting register.

Third Exemplary Embodiment

Figure 10:
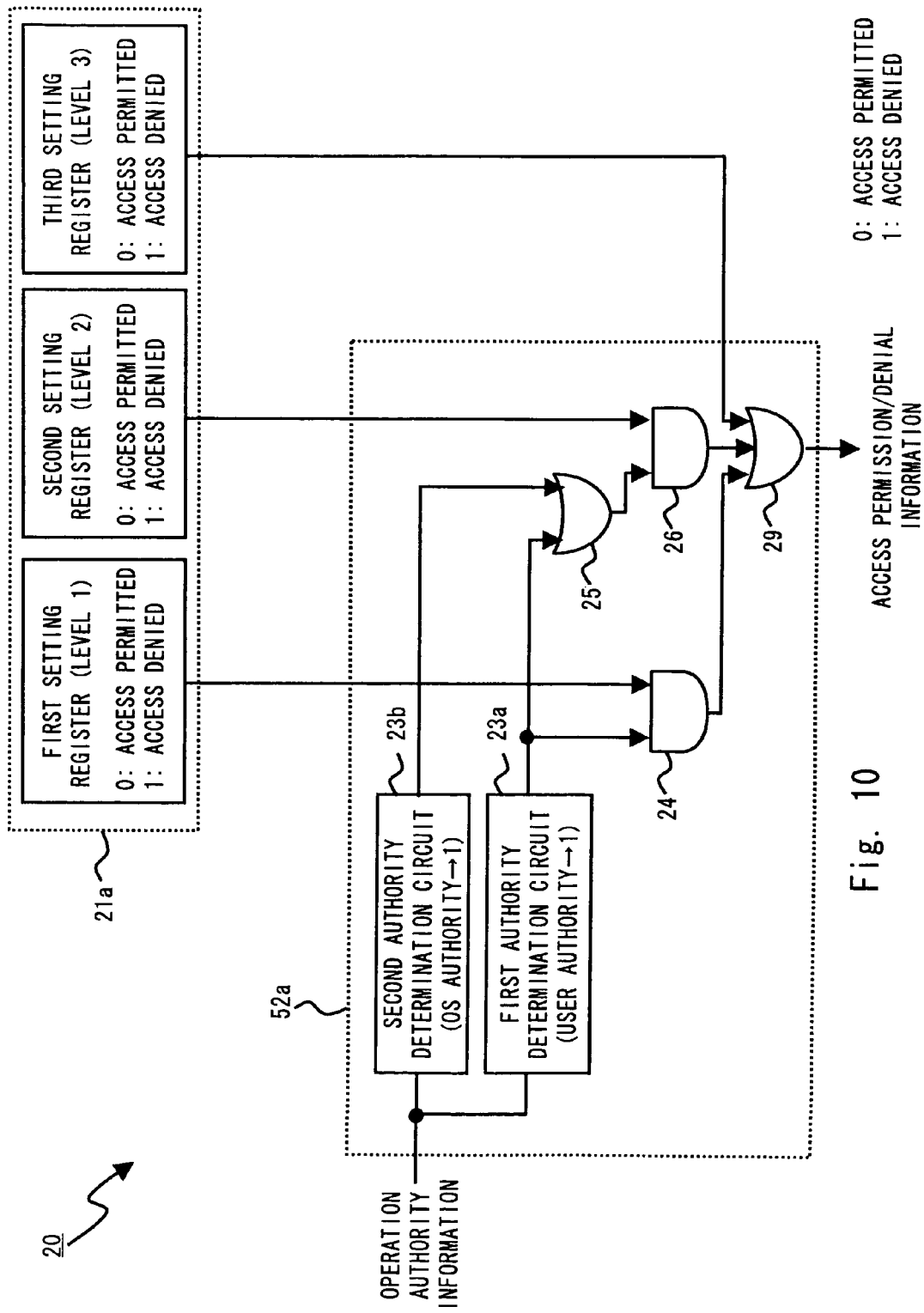
FIG. 10 is a block diagram showing a setting selection circuit according to a third exemplary embodiment of the present invention.

A third exemplary embodiment of the present invention is a modified example of the peripheral device protection setting circuit 20 according to the first exemplary embodiment of the present invention. FIG. 10 shows a block diagram of the peripheral device protection setting circuit 20 according to the third exemplary embodiment of the present invention. Referring to FIG. 10, the peripheral device protection setting circuit 20 according to the third exemplary embodiment of the present invention includes a setting selection circuit 52a.

The setting selection circuit 52a has a configuration in which the third authority determination circuit 23c, the OR circuit 27, and the AND circuit 28 are omitted from the setting selection circuit 22a. In other words, according to the third exemplary embodiment of the present invention, only two operation authority levels, that is, the OS authority level corresponding to the higher level, and the user authority level corresponding to the lower level, are set. Accordingly, the operation authority level corresponding to the third setting register is not present. In short, the third exemplary embodiment of the present invention shows a case where the setting register that performs protection setting of a level higher than the highest level, while the level does not correspond to the operation authority level.

Figure 11:
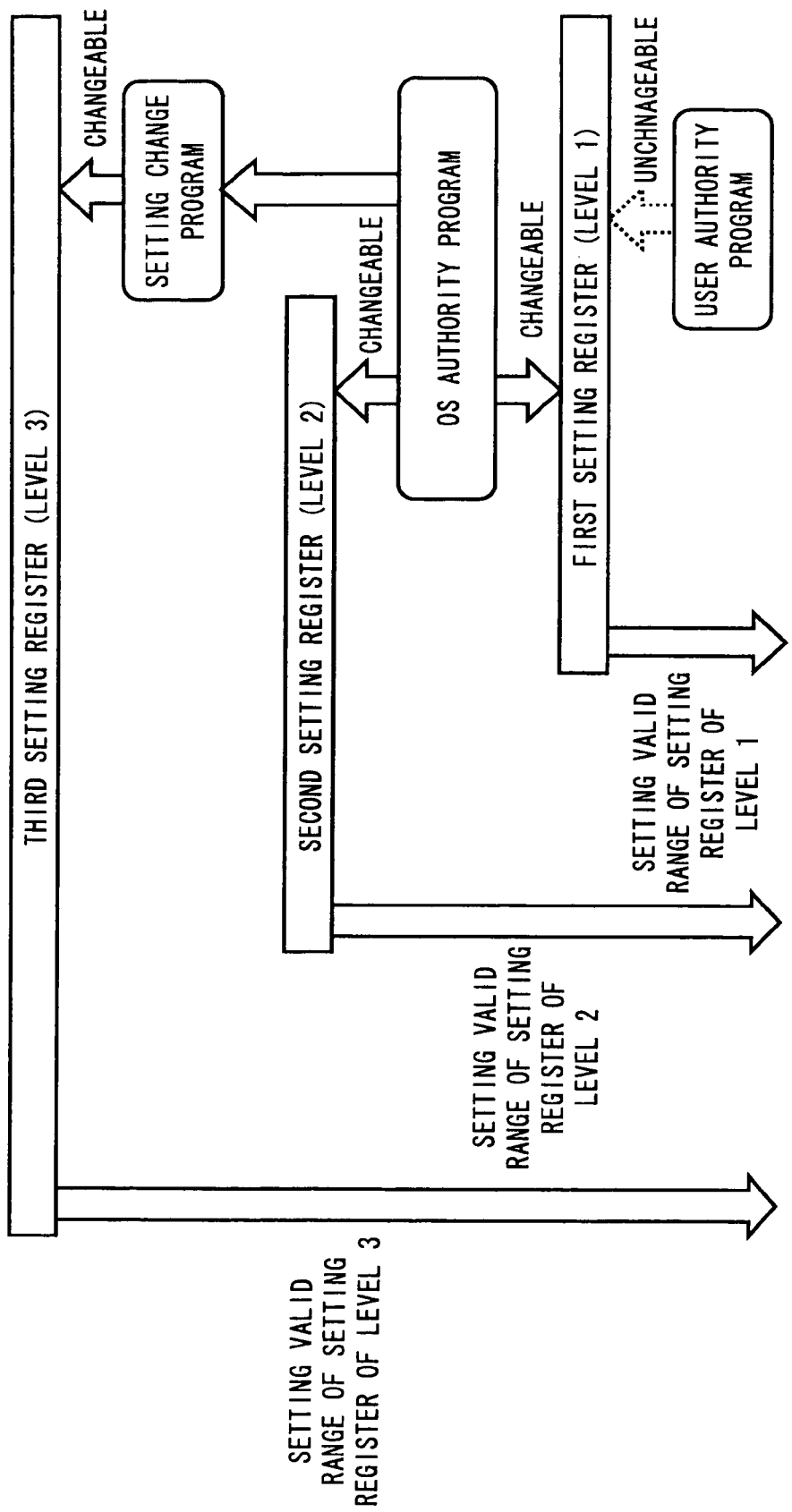
FIG. 11 is a conceptual diagram showing a method of changing the setting registers provided in the data processing apparatus according to the first exemplary embodiment of the present invention.

FIG. 11 shows a conceptual diagram showing a method of changing preset values of setting registers according to the third exemplary embodiment of the present invention. Referring to FIG. 11, the method of changing the preset values according to the third exemplary embodiment of the present invention will be described. As shown in FIG. 11, a program running under the user authority is unable to change setting of any one of the setting registers also in the third exemplary embodiment of the present invention. Meanwhile, according to the third exemplary embodiment of the present invention, a program running under the OS authority changes the setting of each of the first setting register and the second setting register. Further, the OS program calls a setting change program, thereby enabling a change of the preset value of the third setting register.

As described above, the data processing apparatus 1 according to the third exemplary embodiment of the present invention is capable of setting the setting registers respectively corresponding to three authority levels without preparing a trusted program such as a management program. According to the third exemplary embodiment of the present invention, the setting is enabled using the OS program, which results in a reduction in time for producing a management program and a reduction in costs. Furthermore, a time for verifying the management program can be reduced.

The first, second, and third exemplary embodiments can be combined as desirable by one of ordinary skill in the art.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A data processing apparatus, comprising:
    an arithmetic circuit that executes a plurality of programs at one of a first operation authority level and a second operation authority level, the second operation authority level being an operation authority level higher than the first operation authority level; and
    a peripheral device protection circuit that connects to the arithmetic circuit, and that controls access of the arithmetic circuit to at least one peripheral device, wherein the peripheral device protection circuit includes:
        a first protection preset value including a preset value to specify one of permission and denial of the access to the at least one peripheral device;
        a second protection preset value set as a protection level higher than that of the first protection preset value, and including a preset value to specify one of permission and denial of the access to the at least one peripheral device;
        a setting selection circuit that generates access permission/denial information by referring to both the first protection preset value and the second protection preset value when the arithmetic circuit executes access to the at least one peripheral device during a period when the arithmetic circuit operates at the first operation authority level, and that generates the access permission/denial information by referring to the second protection preset value when the arithmetic circuit executes access to the at least one peripheral device during a period when the arithmetic circuit operates at the second operation authority level; and
        an access protection circuit that receives access information about the at least one peripheral device, the access information output from the arithmetic circuit, and the access permission/denial information, and that determines one of permission and denial of access from the arithmetic circuit to at least one peripheral device,
        wherein the arithmetic circuit executes a higher authority transfer program prepared in advance during the operation at the second operation authority level so as to change a third protection preset value set as a protection level higher than that of the second protection preset value, and specifying one of permission and denial of the access of the arithmetic circuit to the at least one peripheral device, the arithmetic circuit operating at one of the first operation authority level and the second operation authority level.

2. The data processing apparatus according to claim 1, wherein the arithmetic circuit executes each of the plurality of programs at one of the first operation authority level and the second operation authority level, and changes at least one of the first protection preset value and the second protection preset value individually for each of the plurality of programs.

3. The data processing apparatus according to claim 1, wherein the arithmetic circuit changes the first protection preset value during the period when the arithmetic circuit operates at the second operation authority level.

4. The data processing apparatus according to claim 1, wherein the arithmetic circuit changes the second protection preset value during the period when the arithmetic circuit operates at the second operation authority level.

5. The data processing apparatus according to claim 1, wherein the arithmetic circuit is prohibited from changing the first protection preset value and the second protection preset value during the period when the arithmetic circuit operates at the first operation authority level.

6. The data processing apparatus according to claim 1, wherein:
    the peripheral device protection circuit has a common protection preset value, the common protection preset value being commonly used among the plurality of programs run at the same operation authority level and including at least one of the first protection preset value and the second protection preset value, and
    the setting selection circuit generates information indicative of one of permission and denial of the access of the arithmetic circuit to the at least one peripheral device by referring to the common protection preset value according to the operation authority level.

7. The data processing apparatus according to claim 1, wherein the peripheral device protection circuit comprises a setting register group including a first setting register that stores the first protection preset value, and a second setting register that stores the second protection preset value.

8. The data processing apparatus according to claim 6, wherein a setting register group includes a cover register that stores the common protection preset value.

9. The data processing apparatus according to claim 7, wherein:
    the at least one peripheral device comprises a plurality of peripheral devices, and
    the setting register group is provided for each of the plurality of peripheral devices.

10. The data processing apparatus according to claim 1, wherein the access protection circuit comprises:
    an access destination determination circuit that outputs a comparison matching result signal indicating a comparison result between a peripheral device address indicating an address of the at least one peripheral device, and the access destination address contained in the access information;
    a permission determination circuit that outputs access control information indicative of one of permission and denial of the access to the at least one peripheral device based on the comparison matching result signal and the access permission/denial information output from the setting selection circuit; and
    an access control circuit that controls whether to transmit the access information to the at least one peripheral device based on the access control information.

11. The data processing apparatus according to claim 1, wherein the setting selection circuit generates the access permission/denial information by referring to a protection preset value of a level at least as high as the second protection preset value when the arithmetic circuit executes access to the at least one peripheral device during a period when the arithmetic circuit operates at the second operation authority level.

12. A method of protecting a peripheral device in a data processing apparatus, the data processing apparatus including an arithmetic circuit that executes a plurality of programs at one of a first operation authority level and a second operation authority level, the second operation authority level being an operation authority level higher than the first operation authority level, and a peripheral device protection circuit that controls access of the arithmetic circuit to the peripheral device based on a first protection preset value including a preset value to specify one of permission and denial of the access to the peripheral device, and based on a second protection preset value set as a protection level higher than that of the first protection preset value and including a preset value to specify one of permission and denial of the access to the peripheral device, the method comprising:
   determining access permission/denial by referring to both the first protection preset value and the second protection preset value when the arithmetic circuit executes access to the peripheral device during a period when the arithmetic circuit operates at the first operation authority level; and
   determining the access permission/denial by referring to the second protection preset value when the arithmetic circuit executes access to the peripheral device during a period when the arithmetic circuit operates at the second operation authority level,
   wherein the arithmetic circuit executes a higher authority transfer program prepared in advance when the arithmetic circuit operates at the second operation authority level so as to change a third protection preset value set as a protection level higher than that of the second protection preset value, and specifying one of permission and denial of the access of the arithmetic circuit to the peripheral device, the arithmetic circuit operating at one of the first operation authority level and the second operation authority level.

13. The method according to claim 12, wherein the arithmetic circuit executes a plurality of programs at one of the first operation authority level and the second operation authority level, and changes at least one of the first protection preset value and the second protection preset value for each of the plurality of programs.

14. The method according to claim 12, wherein the arithmetic circuit changes the first protection preset value during the period when the arithmetic circuit operates at the second operation authority level.

15. The method according to claim 12, wherein the arithmetic circuit changes the second protection preset value during the period when the arithmetic circuit operates at the second operation authority level.

16. The method according to claim 12, wherein the arithmetic circuit is prohibited from changing the first protection preset value and the second protection preset value during the period when the arithmetic circuit operates at the first operation authority level.

17. The method according to claim 12, wherein:
   the peripheral device protection circuit has a common preset value, the common preset value being commonly used among the plurality of programs run at the same operation authority level and including at least one of the first protection preset value and the second protection preset value, and
   the peripheral device protection circuit determines one of permission and denial of the access of the arithmetic circuit to the peripheral device by referring to the common preset value according to the operation authority level.

18. A data processing apparatus comprising:
   an arithmetic circuit that executes a plurality of programs at one of a first operation authority level and a second operation authority level, the second operation authority level being an operation authority level higher than the first operation authority level; and
   a peripheral device protection circuit that is connected to the arithmetic circuit, and that controls access of the arithmetic circuit to at least one peripheral device,
   wherein the peripheral device protection circuit comprises:
      a first setting register that stores a first protection preset value to specify one of permission and denial of the access to the at least one peripheral device;
      a second setting register that stores a second protection preset value set as a protection level higher than that of the first protection preset value and including a preset value to specify one of permission and denial of the access to the at least one peripheral device;
      a setting selection circuit that generates access permission/denial information by referring to both the first protection preset value and the second protection preset value when the arithmetic circuit executes access to the at least one peripheral device during a period when the arithmetic circuit operates at the first operation authority level, and that generates the access permission/denial information by referring to the second protection preset value when the arithmetic circuit executes access to the at least one peripheral device during a period when the arithmetic circuit operates at the second operation authority level; and
      an access protection circuit that receives access information about the at least one peripheral device, the access information output from the arithmetic circuit, and the access permission/denial information, and that determines one of permission and denial of the access from the arithmetic circuit to at least one peripheral device, and
   wherein the arithmetic circuit executes a higher authority transfer program prepared in advance during the operation at the second operation authority level so as to change a third protection preset value set as a protection level higher than that of the second protection preset value, and specifying one of permission and denial of the access of the arithmetic circuit to the at least one peripheral device, the arithmetic circuit operating at one of the first operation authority level and the second operation authority level.

19. The data processing apparatus according to claim 18, wherein:
   the at least one peripheral device comprises a plurality of peripheral devices, and
   the first setting register, the second setting register, and the setting selection circuit are provided for each of the plurality of peripheral devices.

* * * * *